Patented July 12, 1960

2,945,064

2,4-DIHYDROXY-3-METHYLPHENACYLAMINE, 2-HYDROXY-4-METHOXY-3-METHYLPHENACYLAMINE AND PROCESSES OF PREPARING THE SAME

Charles H. Stammer, Clark, N.J., assignor to Merck & Co., Inc., Rahway, N.J., a corporation of New Jersey No Drawing. Filed Apr. 29, 1958, Ser. No. 731,614

3 Claims. (Cl. 260—566)

This invention relates to new phenacylamines and methods of producing these compounds. More particularly, it is concerned with 2,4-dihydroxy-3-methylphenacylamine, the corresponding 4-methoxy compound, and the acid salts thereof. The compounds of this invention are useful as intermediates in the synthesis of novobiocin.

It is an object of the present invention to provide 2,4-dihydroxy-3-methylphenacylamine, corresponding 4-methoxy compounds, and the acid salts thereof. Another object is to provide processes for the preparation of these compounds. Other objects will be apparent from the detailed description of my invention hereinafter provided.

In accordance with the present invention, it is now found that the new phenacylamine compounds can be prepared by processes which may be shown as follows:

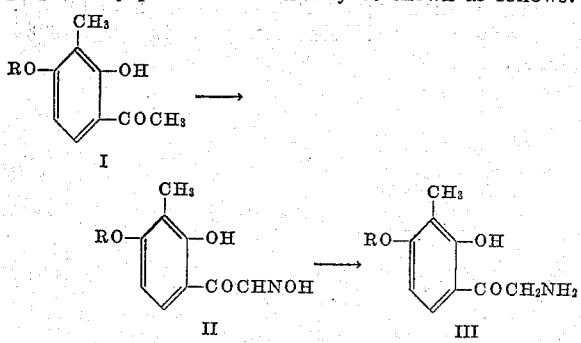

wherein R represents a member from the group consisting of hydrogen and methyl. In this process the acetophenone compound (I) is reacted with alkali metal nitrite and the resulting reaction product is acidified to produce the corresponding oximino acetophenone (II) which upon reduction with hydrogen in the presence of a noble metal catalyst and a small amount of a hydrohalic acid is converted to the desired phenacylamine (III).

The first step of this process is effected by intimately contacting the acetophenone with an alkali metal nitrite in water for sufficient time to effect solution of the reaction mixture, and then acidifying this solution whereupon the desired oximino compound precipitates from solution.

The second step of this process is effected by intimately contacting the intermediate oximino compound with hydrogen in the presence of a minor amount of a hydrohalic acid and a noble metal catalyst for sufficient time to complete the reduction of the oximino compound to the amino compound. Although any of the noble metal catalysts can be utilized in this reduction, I prefer to use palladium, preferably on an inert carrier such as charcoal or activated carbon, since the reaction proceeds readily with these catalysts and is complete within a short time at room temperature. The amount of hydrohalic acid in the reduction medium is not critical, but I find that the use of an amount of acid about equivalent to the weight of the compound being reduced produces very satisfactory results. The reduction is preferably effected in the presence of a suitable inert solvent medium such as methanol, ethanol, and the like. For example, the reduction is effected by dissolving the oximino compound in methanol adding an equivalent weight of concentrated hydrochloric acid and a small amount of palladium on charcoal, and reducing the mixture with hydrogen. After the reduction is complete the product in the form of the hydrochloride salt is recovered by removing the catalyst and evaporating the solvent solution.

Pursuant to a further embodiment of the invention, it is now found that the methoxy compound, namely, 2-hydroxy-3-methyl-4-methoxy phenacylamine is hydrolyzed by heating with concentrated hydrobromic acid to produce the 2,4-dihydroxy-3-methylphenacylamine.

The following examples are presented as illustrative embodiments of the present invention.

EXAMPLE 1

*Preparation of 3-methyl-ω-oximinoresacetophenone*

A suspension of 1.7 g. of 3-methylresacetophenone in 10 ml. of water containing 1.0 g. of sodium nitrite is allowed to stand at room temperature until all the solid has dissolved. Acidification of the solution causes precipitation of the 3-methyl-ω-oximinoresacetophenone as a yellow crystalline solid.

The 3-methylresacetophenone employed as a starting material in the foregoing example can be prepared as follows:

To a solution of 66.2 g. of resacetophenone and 97.5 g. of potassium hydroxide in 450 ml. of methanol, cooled in an ice bath, is added 135 ml. of methyl iodide. The mixture is allowed to warm up to room temperature on standing overnight and then, after addition of 35 ml. of methyl iodide, is refluxed for four hours. The reaction mixture is evaporated to dryness in vacuo and 700 ml. of water is added to the residue. The dark neutral solution is extracted twice with 500 ml. portions and twice with 250 ml. portions of ether. The ether extracts are dried and evaporated to give 37.5 g. of an oily solid. Recrystallization of this product gives 20 g. of 2-hydroxy-3-methyl-4-methoxyacetophenone, M.P. 84–85° C.

A solution of 5 g. of 2-hydroxy-3-methyl-4-methoxyacetophenone in 75 ml. of concentrated hydrobromic acid is refluxed for three hours. The mixture is diluted with hot water, filtered, and a little sodium bisulfite is added to the filtrate. It is saturated with sodium chloride and extracted with ether. The ether extracts are evaporated and the residue of 3-methylresacetophenone is recrystallized from benzene.

EXAMPLE 2

*Preparation of 2,4-dihydroxy-3-methylphenacylamine hydrochloride*

To a solution of 2 g. of 3-methyl-ω-oximinorseacetophenone in 30 ml. of methanol containing 2 ml. of concentrated hydrochloric acid is added an equal weight of palladium on activated carbon. The mixture is shaken at room temperature in an atmosphere of hydrogen until two equivalents of hydrogen have been adsorbed. The catalyst is collected on a filter and the filtrate is evaporated to dryness in vacuo. The residue is recrystallized from ethanol-dioxane to give 2,4-dihydroxy-3-methylphenacylamine hydrochloride as fine white needles, M.P. 258–263° C. dec.

EXAMPLE 3

*Preparation of 2-hydroxy-3-methyl-4-methoxy-ω-oximinoacetophenone*

A suspension of 2 g. of 2-hydroxy-3-methyl-4-methoxyacetophenone in 10 ml. of water containing 1 g. of sodium nitrite is allowed to stand until the solid dissolves. Acidification of the solution gives 2-hydroxy-3-methyl-4-methoxy-ω-oximinoacetophenone as a crystalline yellow solid.

EXAMPLE 4

*Preparation of 2-hydroxy-3-methyl-4-methoxyphenacyl amine hydrochloride*

To a solution of 2 g. of 2-hydroxy-3-methyl-4-methoxy-ω-oximinoacetophenone in 30 ml. of methanol containing 2 ml. of concentrated hydrochloric acid is added an equal weight of a palladium on activated carbon catalyst. The mixture is shaken at room temperature in an atmosphere of hydrogen until two equivalents of hydrogen are absorbed. The catalyst is collected on a filter and the filtrate evaporated to dryness in vacuo. The residue is recrystallized from ethanol-dioxane to give 2-hydroxy-3-methyl-4-methoxyphenacylamine hydrochloride.

EXAMPLE 5

*Preparation of 2,4 - dihydroxy - 3 - methylphenacylamine hydrobromide*

A solution of 5 g. of 2-hydroxy-3-methyl-4-methoxyphenacylamine hydrochloride in 75 ml. of concentrated hydrobromic acid is refluxed for three hours. The mixture is diluted with hot water, filtered, and a little sodium bisulfite is added to the filtrate. It is saturated with sodium chloride and extracted with ether. The ether extracts are evaporated and the residue is recrystallized from ethanoldioxane to give 2,4-dihydroxy-3-methylphenacylamine hydrobromide.

The 2,4-dihydroxy-3-methylphenacylamine prepared as described above is a useful intermediate in the synthesis of novobiocin. Thus, this compound can be converted to novobiocin in accordance with processes described in my co-pending application Serial No. 731,605, filed April 29, 1958.

Various changes and modifications of the invention can be made and, to the extent that such variations incorporate the spirit of this invention, they are intended to be included within the scope of the appended claims.

What is claimed is:

1. A compound from the group consisting of 3-methyl-ω - oximinoresacetophenone, 2 - hydroxy - 3 - methyl - 4 - methoxy-ω-oximinoacetophenone.

2. 3-methyl-ω-oximinoresacetophenone.

3. 2 - hydroxy - 3 - methyl - 4 - methoxy - ω - oximinoacetophenone.

References Cited in the file of this patent

UNITED STATES PATENTS

| | | |
|---|---|---|
| 2,462,008 | Snider et al. | Feb. 15, 1949 |
| 2,711,428 | Goodson et al. | June 21, 1955 |
| 2,731,499 | Caroar | Jan. 17, 1956 |
| 2,786,871 | Winterhalder | Mar. 26, 1957 |
| 2,832,804 | Richter et al. | Apr. 29, 1958 |

FOREIGN PATENTS

| | | |
|---|---|---|
| 71,312 | Germany | Oct. 6, 1893 |
| 518,636 | Germany | Feb. 20, 1931 |

OTHER REFERENCES

Gnagy: J.A.C.S., vol. 45, pages 806–807 (1923).

Beilstein: Handbuch der Organischen Chemie, vol. 14, 2nd supp., pages 157–158 (1948).

Baker et al.: Chem. Abstr., vol. 29, page 5091 (1935).

Kaneniwa: Chem. Abstracts, vol. 50, page 3284 (1956).